United States Patent [19]

Yeh

[11] Patent Number: 4,728,052
[45] Date of Patent: Mar. 1, 1988

[54] COMBINED BAIT CASE AND FISHING REEL

[76] Inventor: Shih-Yuan Yeh, No. 2-4, Chen-Hsing Road, Tai-Ping Hsiang, Taichung Hsien, Taiwan

[21] Appl. No.: 52,618

[22] Filed: May 20, 1987

[51] Int. Cl.[4] ............................................. A01K 89/00
[52] U.S. Cl. ................................. 242/84.1 K; 43/54.1
[58] Field of Search ............... 43/54.1, 55, 21.2, 25.2, 43/57.1; 242/84.1 K, 84.2 J

[56] References Cited

U.S. PATENT DOCUMENTS 3,010,673  11/1961  Marconi ........................... 242/84.2 J
4,082,235  4/1978  Danvergne ....................... 242/84.2 J

FOREIGN PATENT DOCUMENTS 80928  10/1952  Sweden ........................... 242/84.2 J
0659120  4/1979  U.S.S.R. ........................... 242/84 K Primary Examiner—Nicholas P. Godici
Assistant Examiner—Karen Skillman
Attorney, Agent, or Firm—Poms, Smith, Lande & Rose

[57] ABSTRACT

A combined bait case and fishing reel comprising a fishing reel and a bait case. The bait case is a cylinder which is divided into compartments to contain the bait. The fishing reel has a plate wall with four screw holes: two on the upper portion and two on the lower portion. The bait case is pivotted connected to the fishing reel on the lower portion of the fishing reel by threading screws passing through the lower holes and a pivotted block. Additionally, the upper holes are used for fixing an engaged block which engages with an engagement plate of the bait case so as the prevent the cover from the slipping out when closing the cover.

2 Claims, 4 Drawing Figures

COMBINED BAIT CASE AND FISHING REEL

BACKGROUND OF THE INVENTION

This invention relates to a combined bait case with a fishing reel as a whole body disposed on the fishing rod so that fishermen can take the bait easily and conveniently.

Up until the present, fishermen have used a bait case which can be hung on their hat or clothes when fishing while standing in water. This made it difficult for him to change the bait, as he had to first put the fishing rod on a bracket or the like. In order to resolve this inconvenience, this invention provides a combined bait case and fishing reel which is used for directly changing the bait without putting down the fishing rod.

SUMMARY OF THE INVENTION

The principle objective of this invention is to provide a combined bait case and fishing reel which the bait case is pivotted about the side of the fishing reel so that it is easy and convenient to change the bait.

DETAILED DESCRIPTION OF THE PREFERRED EMBODIMENT

Figure 1:
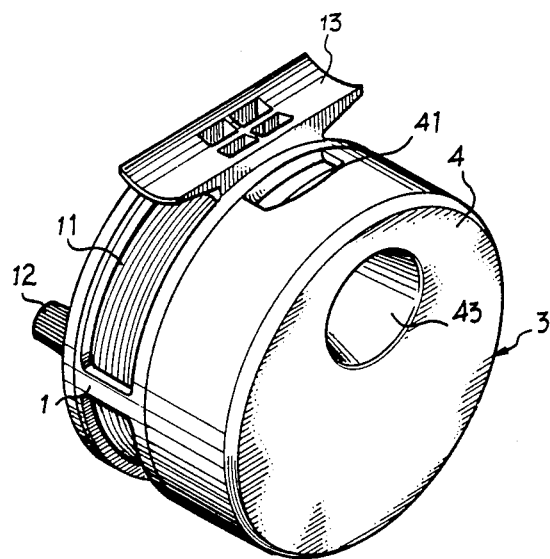
FIG. 1 is a perspective view of this invention.

For a detailed description of the construction of this invention, please refer to the drawings. FIG. 1 shows a perspective view of this invention. Element 1 is same as the general fishing reel which comprises a rotating handle 12 to control the release or pull in fishing line 11. The top of the fishing reel portion 1 sets a connecting plate 13, by means of which the combined bait case and fishing reel can be fixed on a fishing rod. Because the fishing reel portion 1 in and of itself is a conventional one and is not in the range of inventiveness of this invention, there is no need to further mention it.

Figure 2:
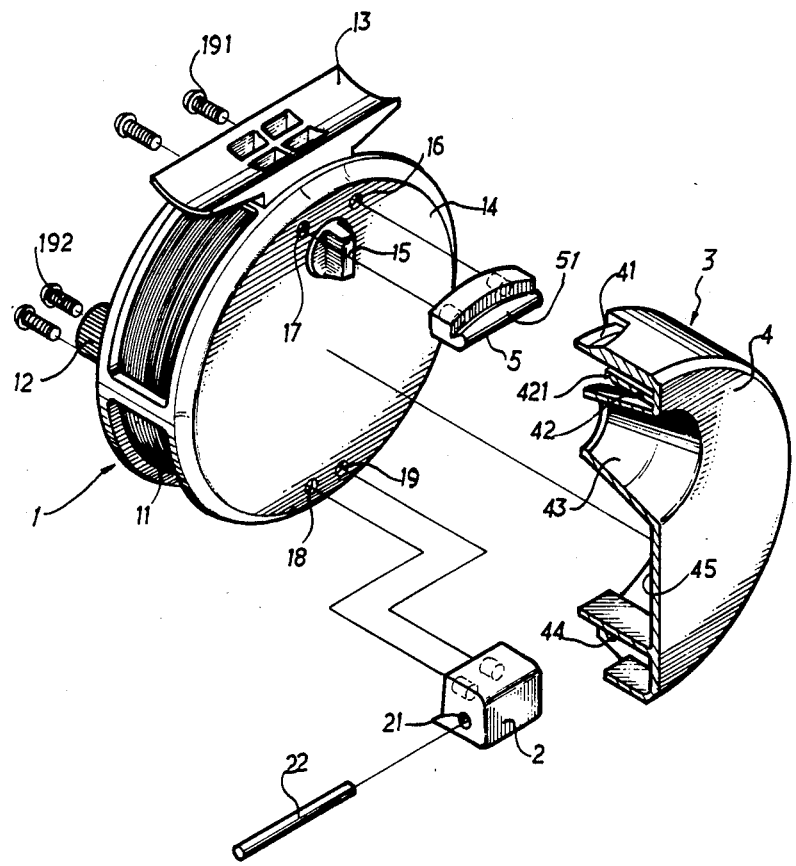
FIG. 2 is an exploded view of this invention.
Figure 3:
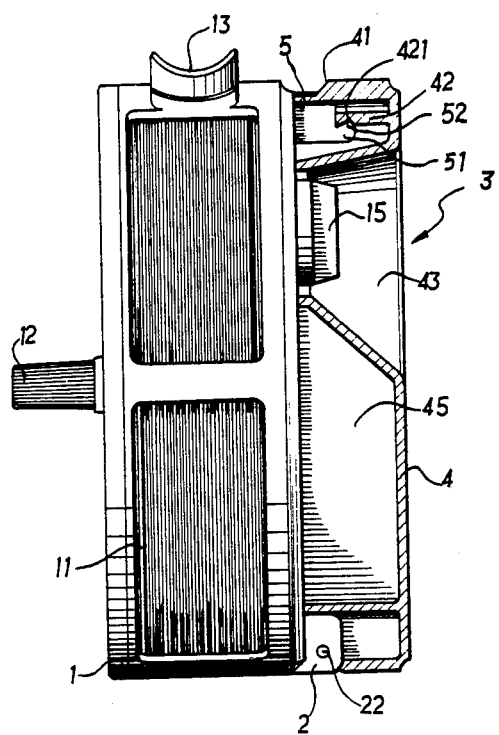
FIG. 3 is a sectional view of this invention.

Now referring to FIGS. 1 and 2, it can be seen that the principle characteristics of this invention concern the bait case portion 3. The bait case portion 3 comprises a cover 4 which is pivotted about the lower part of the side wall 14 of the fishing reel portion so that the cover 4 can be opened downward. The side wall 14 of the fishing reel portion 1 has two holes 16, 17 bored on the upper part and two holes 18, 19 bored on the lower parts, respectively. Four screws 191 and 192 are screwed into these holes from the other side. Two screws 192 pass through the holes 18, 19 and thread into a pivotted block 2. The pivotted block 2 is installed on the bottom of the inner side of the cover 4 and connects to the cover 4 by a pin 22 passing through a central hole 21 on the pivotted block and a pivotal hole 44 on the cover. Therefore, the cover can be turned up and down with the pivotted block 2 acting as a pivot. Further, the side wall 14 of the fishing reel 1 comprises a dial 15 which threadably engages the fishing reel portion 1 and the fishing line 11 together.

The bait case cover 4 is designed to correspond to the features of the inside 14 of the fishing reel portion 1. The cover 4 is cylindrical and has a hollow cavity 43 on the portion corresponding with the dial 15. The diameter of the hollow cavity 43 gradually decreases inwardly so that the smallest diameter is engageable with that of the dial 15 and so that the portion having larger diameter of the cavity 43 is large enough that the user can easily adjust dial 15.

Figure 4:
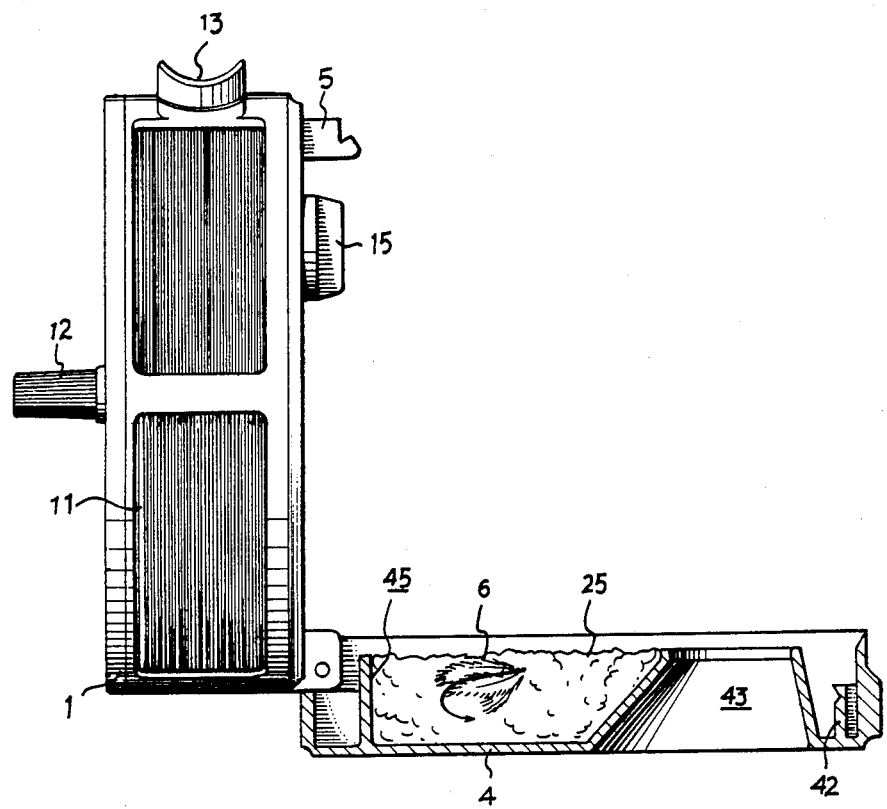
FIG. 4 is a sectional view of this invention showing the cover opened.

The inside of the cover 4 includes a compartment 45 which occupies the space from the bottom of the hollow cavity and to the top of the pivotting portion. The bait is installed in the compartment 45. As shown in FIG. 4, a sponge 25 is set in the compartment 45 which is used to hang the bait 6 thereon for ease of access.

On the middle portion of the top of the inner space of the cover 4, an engagement plate 42 is set for engaging with an engaged block 5. The engaged block 5 is a rectangular body with an extended strip 51 on the lower portion thereof which is threadably retained on the side 14 of the fishing reel portion 1 by screws 191. Please note that the front end of the extended strip 51 of the engaged block 5 has a protruberance 52 so that the protruberance 52 can engage with a slot 421 below the front end of the engagement plate 42 to prevent the cover 4 from the slipping out when closing the cover 4.

Accordingly, the combined bait case and fishing reel of this invention forms a whole body which is easily fixed on the fishing rod. Since the bait case portion is installed on the fishing rod together with the fishing reel portion, it is not necessary for a person to put down the fishing rod to change the bait. Additionally, the cover 4 of the bait case 3 has a recess 41 on the top thereof so as to allow the cover 4 to be easily pulled opened.

As various possible embodiments might be made of the above invention without departing from the scope of the invention, it is to be understood that all matter herein described or shown in the accompanying drawing is to be interpreted as illustrative and not in a limiting sense. Thus it is will be appreciated that the drawings are exemplary of a preferred embodiment of the invention.

I claim:

1. A combined bait case and fishing reel comprising a fishing reel portion and a bait case portion, wherein:
one side of the fishing reel portion comprises a fishing line therein and a rotating handle, another side of the fishing reel portion has a plate wall which has two holes bored on an upper portion thereof and two holes bored on a lower portion thereof and also has a dial; a connecting arc plate set on top of the fishing reel portion used for fixing the combined bait case and fishing reel on a fishing rod; a circumference of the plate wall being inclined outward so as to provide better fixture of the bait case portion;
the bait case portion comprising a cylindrical cover which has a hollow cavity on a corresponding position with the dial; the hollow cavity being substantially cone-shaped and an outer diameter thereof being larger than an inner one; an engagement plate being installed above the hollow cavity in the cover and a lower portion of a front end of the engagement plate has a slot; a rectangular engaged block with an extended engagement strip, said engagement strip being screwed on an upper portion of the plate wall of the fishing reel portion by threading screws through the holes of the upper portion thereof; the front end of the extended engagement strip having a protuberance which is engageable with the slot of the engagement plate to prevent the cover from slipping out;

the cover being pivotal about the side wall of the fishing reel portion by passing a pin through a central hole of a pivotted block and a pivotal hole on the lower portion in the cover; the pivotted block being threadably secured on the lower portion of the side wall of the fishing reel by screws through the holes on the lower portion of the fishing reel portion; a recess is set on the top of the outer of the cover for opening the cover.

2. A combined bait case and fishing reel as claimed in claim 1, wherein a space between the hollow cavity and the pivotted portion of the cover is a compartment for containing the bait; a sponge or the like being installed on the compartment for hanging the bait.

* * * * *